US008923500B2

(12) United States Patent
Levine

(10) Patent No.: US 8,923,500 B2
(45) Date of Patent: *Dec. 30, 2014

(54) COMMUNICATION NETWORKS IN WHICH AN APPLICATION SERVER AND MULTIPLE DIRECTORY NUMBERS ARE USED TO PROVIDE INTERNET PROTOCOL LIKE FEATURES TO TIME DIVISION MULTIPLEXED PHONE LINES

(71) Applicant: AT&T Intellectual Property I, L.P., Atlanta, GA (US)

(72) Inventor: David Levine, Smyrna, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/058,834

(22) Filed: Oct. 21, 2013

(65) Prior Publication Data

US 2014/0044124 A1     Feb. 13, 2014

Related U.S. Application Data

(63) Continuation of application No. 11/517,706, filed on Sep. 8, 2006, now Pat. No. 8,565,406.

(51) Int. Cl.
*H04M 7/00*     (2006.01)
*H04M 3/42*     (2006.01)
*H04L 12/66*    (2006.01)
*H04L 29/06*    (2006.01)
*H04Q 3/00*     (2006.01)

(52) U.S. Cl.
CPC ........... *H04L 65/1013* (2013.01); *H04M 7/003* (2013.01); *H04Q 3/0037* (2013.01); *H04L 65/1069* (2013.01); *H04Q 2213/13091* (2013.01); *H04Q 2213/13175* (2013.01); *H04Q 2213/13345* (2013.01); *H04Q 2213/13389* (2013.01)
USPC ............ 379/221.09; 379/207.16; 379/373.02; 370/352; 370/354

(58) Field of Classification Search
USPC ............. 379/221.08, 221.09, 207.16, 373.02; 370/352–356
See application file for complete search history.

(56) References Cited

U.S. PATENT DOCUMENTS

| | | | |
|---|---|---|---|
| 5,963,864 A | 10/1999 | O'Neil et al. | 455/445 |
| 6,661,785 B1 | 12/2003 | Zhang et al. | 370/352 |
| 2004/0110465 A1 | 6/2004 | Bedingfield et al. | 455/3.05 |
| 2007/0183399 A1 | 8/2007 | Bennett | 370/352 |
| 2008/0056235 A1 | 3/2008 | Albina et al. | 370/352 |

*Primary Examiner* — Nafiz E Hoque
(74) *Attorney, Agent, or Firm* — Myers Bigel Sibley & Sajovec, PA

(57) ABSTRACT

A communication network includes a switching system, an application server, and a softswitch that communicatively couples the application server to the switching system. The switching system is configured to detect a first call to a primary directory number associated with a phone line and to forward the first call to the application server. The application server is configured to instruct the softswitch to generate a second call to a RingMaster directory number associated with the phone line. And the softswitch is configured to bridge the first and second calls responsive to detection of a communication path completion to the phone line.

7 Claims, 5 Drawing Sheets

COMMUNICATION NETWORKS IN WHICH AN APPLICATION SERVER AND MULTIPLE DIRECTORY NUMBERS ARE USED TO PROVIDE INTERNET PROTOCOL LIKE FEATURES TO TIME DIVISION MULTIPLEXED PHONE LINES

RELATED APPLICATION

This application is a continuation of U.S. application Ser. No. 11/517,706, filed Sep. 8, 2006, the disclosures of which are hereby incorporated herein by reference as if set forth in its entirety.

BACKGROUND OF THE INVENTION

The present invention relates to communication networks and methods of operating the same, and, more particularly, to an overlay architecture for providing Internet Protocol (IP) like features to time division multiplexed phones and methods of operating the same.

Internet telephony, also referred to herein as Voice-Over Internet Protocol (VoIP), Voice-Over Network (VoN), and/or Internet Protocol Telephony (IP Telephony), is becoming increasingly popular due, in part, to marked improvements in reliability and sound quality of the service. The improved performance of Internet telephony communications may be due to upgrades made to the Internet backbone through improved switching fabrics, such as Asynchronous Transfer Mode (ATM) fabrics, and to implementation of new communications standards, such as standards for transport protocols, directory services, and/or audio codec format.

Currently, to provide Internet telephony communications to a customer, a customer obtains equipment, such as Integrated Access Devices (IADs), Analog Terminal Adaptors (ATAs), telephone adapters (TAs), and the like, to be installed at the customer's premises, for example, a customer's home. The equipment is used to support a voice path within the premises and through a broadband connection, for example, a digital subscriber line (DSL) connection, back to an Internet Service Provider (ISP). Once the necessary equipment is installed, customers/subscribers can connect their existing analog phones, for example, Plain Old Telephone Service (POTS) phones, to the ATA(s). The ATA(s) provide such functionality as dial tone, battery, and power ringing as part of providing POTS functionality through the VoN service. Normally, a Central Office (CO) switch provides dial tone, battery, and power ringing for analog phones.

VoN technology may provide telephone users with such features as calling name and number, call disposition options, and the like. While some customers may desire such features, they may also prefer to maintain their analog phones based on time division multiplexing (TDM) technology that are powered by the CO rather than acquire the customer premises equipment (CPE) to support VoN service.

SUMMARY

According to some embodiments of the present invention, a communication network is operated by detecting a first call to a primary directory number associated with a phone line, forwarding the first call to an application server, generating a second call from the application server to a RingMaster directory number associated with the phone line, detecting a communication path completion to the phone line, and bridging the first call and the second call responsive to detection of the communication path completion.

In other embodiments, forwarding the first call to the application server comprises routing the first call to the application server without power ringing the phone line associated with the primary and RingMaster directory numbers.

In still other embodiments, generating the second call from the application server to the RingMaster directory number comprises power ringing the phone line associated with the primary and RingMaster directory numbers.

In still other embodiments, generating the second call from the application server to the RingMaster directory number comprises sending a query to a Signal Control Point (SCP) to determine how to process the second call, determining at the SCP that calls to the RingMaster directory number are terminated at the phone line associated with the RingMaster directory number, and terminating the second call to the phone line associated with the primary and RingMaster directory numbers responsive to the determination that calls to the second directory number are terminated at the phone line associated with the RingMaster directory number.

In still other embodiments, forwarding the first call to the application server comprises sending a query to a Signal Control Point (SCP) to determine how to process the first call, determining at the SCP that the primary directory number has an Internet Protocol (IP) overlay feature associated therewith, and forwarding the first call to the application server responsive to the determination that the primary directory number has an IP overlay feature associated therewith.

In still other embodiments, call termination features are activated on a computer associated with the phone line via the application server.

In still other embodiments, the call termination features comprise displaying calling name and/or number, call forwarding, call forwarding to voice mail, recording the call instance in a call log, and/or processing incoming calls based on a defined profile.

In still other embodiments, forwarding the first call to the application server comprises forwarding the first call to a Voice over Network (VoN) number associated with the phone line.

In still other embodiments, generating the second call from the application server to the RingMaster directory number associated with the phone line comprises using a directory number associated with a calling party associated with the first call as a calling number associated with the second call from the application server to the RingMaster directory number.

In further embodiments of the present invention, a communication network is operated by initiating a call via a computer associated with a first phone line to a second phone line, detecting the call initiation at an application server, establishing a call between the application server and the first phone line, generating a call between the application server and the second phone line, and bridging the call between the application server and the first phone line and the call between the application server and the second phone line so as to create a call between the first phone line and the second phone line.

In still further embodiments, the first phone line has a primary directory number and a RingMaster directory number associated therewith such that calls to the primary directory number are forwarded to the application server and calls to the RingMaster directory number are terminated to the first phone line. Establishing the call between the application server and the first phone line comprises generating a call from the application server to the RingMaster directory number.

In still further embodiments, generating the call from the application server to the RingMaster directory number comprises sending a query to a Signal Control Point (SCP) to determine how to process the call from the application server to the RingMaster directory number, determining at the SCP that calls to the RingMaster directory number are terminated at the first phone line, which is associated with the RingMaster directory number, and terminating the call from the application server to the RingMaster directory number to the first phone line responsive to the determination that calls to the RingMaster directory number are terminated at the first phone line.

In still further embodiments, generating the call between the application server and the second phone line comprises generating the call between the application server and the second phone line responsive to establishing the call between the application server and the first phone line.

In other embodiments of the present invention, a communication network comprises a switching system, an application server and a softswitch that communicatively couples the application server to the switching system. The switching system is configured to detect a first call to a primary directory number associated with a phone line and to forward the first call to the application server, the application server is configured to instruct the softswitch to generate a second call to a RingMaster directory number associated with the phone line, and the softswitch is configured to bridge the first and second calls responsive to detection of a communication path completion to the phone line.

In still other embodiments, the phone line is a first phone line, the application server is further configured to detect a call that is initiated by a computer associated with the first phone line to a second phone line, to instruct the softswitch to establish a call with the first phone line, to instruct the softswitch to generate a call to the second phone line, and the softswitch is configured to bridge the call between the application server and the first phone line and the call between the application server and the second phone line so as to create a call between the first phone line and the second phone line.

In still other embodiments, a Signal Control Point (SCP) is communicatively coupled to the switching system and is configured determine that calls to the primary directory number are forwarded to the application server if the primary directory number has an Internet Protocol (IP) overlay feature associated therewith, and that calls to the RingMaster directory number are terminated at the first phone line associated therewith responsive to queries from the switching system.

In still other embodiments, a user interface server is connected between the computer associated with the first phone line and the application server that is configured to provide a user interface via which a user can initiate the call to the second phone line.

In still other embodiments, the application server is further configured to instruct the softswitch to generate the call to the second phone line responsive to establishing the call between the application server and the first phone line, and the softswitch is further configured to bridge the call between the application server and the first phone line and the call between the application server and the second phone line responsive to detection of a communication path completion to the second phone line.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

Figure 1:
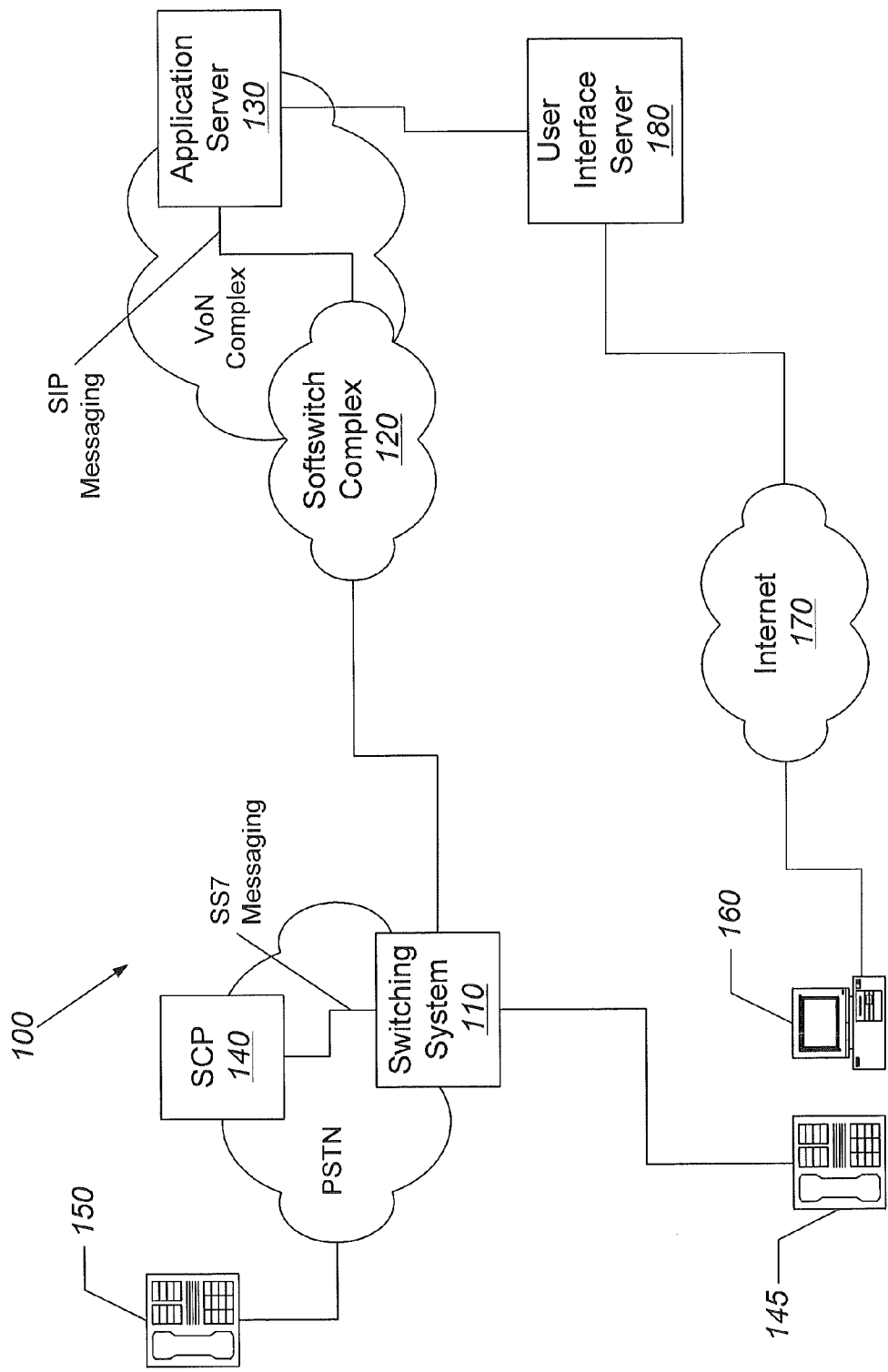
FIG. 1 is a block diagram that illustrates a communication network architecture for providing Internet Protocol (IP) like features to time division multiplexed phone lines in accordance with some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as methods, electronic devices, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Some embodiments of the present invention arise from a realization that an application server in conjunction with a softswitch complex may provide an overlay architecture for the public switched telephone network (PSTN) so as to provide Internet Protocol (IP) like features for customers using analog phones based on time division multiplexing (TDM) technology.

Referring now to FIG. 1, an exemplary communication network 100, in accordance with some embodiments of the present invention, includes a switching system 110, a softswitch complex 120, an application server 130, and a Signal Control Point (SCP) that are communicatively coupled as shown. The switching system 110 may include a Class 5 Switch, such as the 5ESS™ switch sold by Lucent Technologies, Inc. The switching system 110 may terminate thousands of analog phone lines as illustrated by the analog phone 145. The switching system 110 comprises a portion of the Public Switched Telephone Network, which includes many wireline/wireless switching systems and signaling networks, such as Common Channel Signaling (CCS) networks, One such CCS network is the Signaling System 7 (SS7) network.

In an SS7 network, signaling messages are used to setup, manage, and release network resources to complete calls/connections. The signaling traffic is carried by one or more Signal Transfer Points (STPs). An STP is typically embodied as a packet switch that routes each incoming message to an outgoing signaling link based on routing information contained in the SS7 message.

The SS7 network further comprises SCPs, such as SCP 140 shown in FIG. 1, which may optionally be used to provide Intelligent Network (IN) services by allowing the switching system 110 to access the SCP 140 via special signaling messages.

As discussed above, the PSTN includes many wireline and wireless switching systems that may terminate phone lines of varying types as represented by phone 150. Thus, phone 150 may be, for example, an analog phone, digital phone, or mobile terminal. As used herein, the term "mobile terminal" may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

One or more trunks may communicatively couple the switching system and the softswitch complex 120. In general, the softswitch complex 120 may provide an interface between circuit switched networks, such as the PSTN, and packet switched networks, such as the Internet 170. The softswitch complex 120 may comprise elements, such as a softswitch, media server, and trunk gateway that is used to established connections to the PSTN.

The softswitch complex 120 in combination with the application server 130 may comprise part of a VoN complex that can be viewed as an overlay network that can provide IP like features, which conventionally are provided to customers that have purchased VoIP service and have installed the accompanying customer premises equipment (CPE), to customers that have an analog phone, such as the analog phone 145. As understood by those of skill in the art, the VoN complex may include other servers and systems in addition to the softswitch complex 120 and application server 130, such as, but not limited to, Network servers, Feature Servers, Web servers, Media servers, etc. The softswitch complex 120 may communicate with the application server 130 using Session Initiation Protocol (SIP) messaging. SIP is used to establish communication sessions in an IP network. For example, a session may be a one-to-one voice call or a session may be more complex, such as one-to-many conference calls involving multimedia services. SIP may also be used to facilitate VoIP services, in which voice is transported in IP data packets that are re-assembled and converted into an audio signal for the recipient. In some embodiments of the present invention, the application server 130 may run the BroadWorks™ VoIP application software provided by the BroadSoft™ corporation of Gaithersburg Md. to provide IP like features to a customer that uses the analog phone 145 and computer 160. In particular embodiments, the "Remote Office" feature of the BroadWorks VoIP application software may be used to facilitate various operations described herein.

The computer 160 is connected to the application server 130 via the Internet 170 and, optionally, a user interface server 180 or Web server. As the application server 130 may run third-party software, such as the BroadWorks VoIP application software discussed above, a network operator may wish to provide their own user interface to their customer via the user interface server rather than use the user interface provided by the third-party application software running on the application server 130. The computer 160 may be associated with the phone 145 line in that it may be used in the same home or business and the VoN complex may use the computer 160 to provide the IP like features that traditionally are provided via a digital phone.

A global network, such as the Internet 170 or other publicly accessible network, may connect the various elements of the communication network 100. A wide area network, a local area network, an Intranet, and/or other private network may interconnect various elements of the network, which may not be accessible by the general public. Thus, the communication network 100 may represent a combination of public and private networks or a virtual private network (VPN). Although FIG. 1 illustrates an exemplary communication network, it will be understood that the present invention is not limited to such configurations, but is intended to encompass any configuration capable of carrying out the operations described herein.

The functionality of various network elements of the communication network 100 of FIG. 1 may be implemented as a single processor system, a multi-processor system, or even a network of stand-alone computer systems, in accordance with various embodiments of the present invention.

Computer program code for carrying out operations of the communication network 100 discussed above with respect to FIG. 1 may be written in a high-level programming language, such as Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. In some embodiments, the computer program code may include commercially available applications and/or components provided by third parties, such as the BroadWorks VoIP application software discussed above. It will be further appreciated that the functionality of any or all of the program modules may also be implemented using discrete hardware components, one or more application specific integrated circuits (ASICs), or a programmed digital signal processor or microcontroller.

The present invention is described hereinafter with reference to flowchart and/or block diagram illustrations of methods, communication networks, and/or computer program products in accordance with some embodiments of the invention. These flowchart and/or block diagrams further illustrate exemplary operations of operating a communication network so as to provide IP like features to a customer with an analog phone line and a computer in accordance with various embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 2:
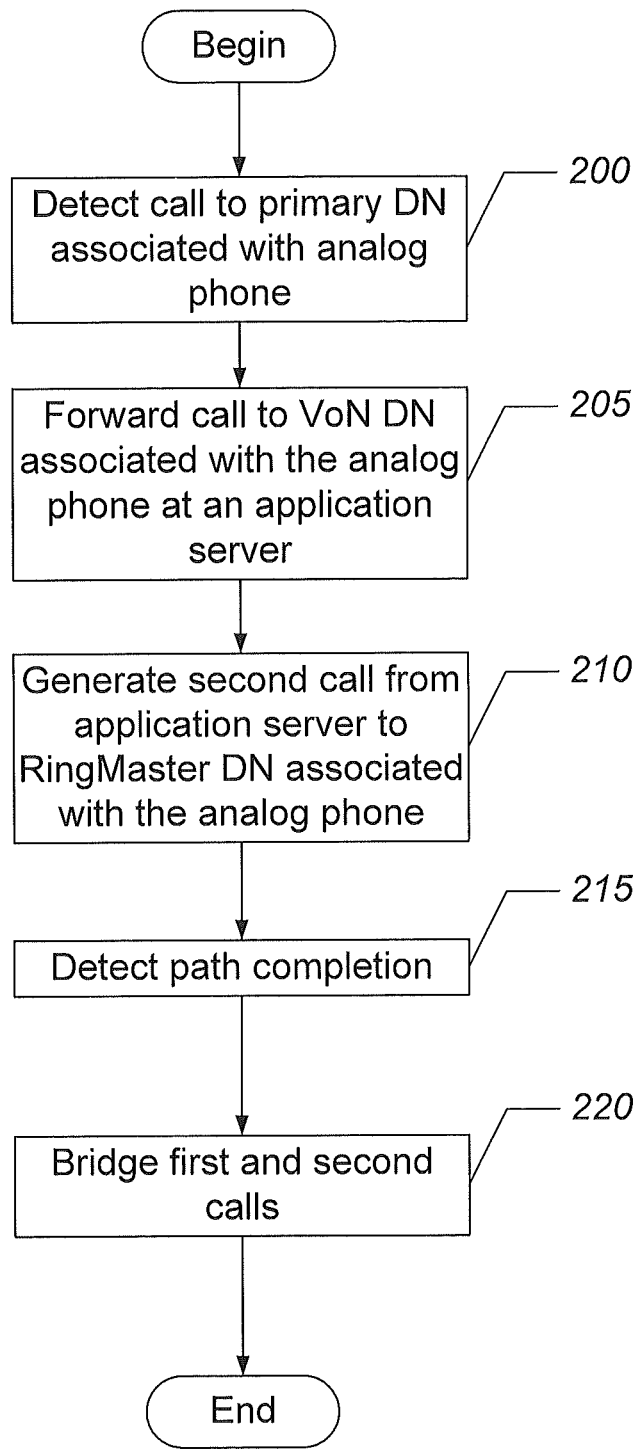
FIGS. 2-5 are flowcharts that illustrate operations of the communication network of FIG. 1 in accordance with some embodiments of the present invention.

Operations for providing IP like features to an analog phone line customer via a VoN overlay network, according to some embodiments of the present invention, will now be described with reference to the flowcharts of FIGS. 2-5 and the communication network architecture of FIG. 1. FIG. 2 illustrates operations for terminating a call to the analog phone 145 line in accordance with some embodiments of the present invention. Operations begin at block 200 where a Termination Attempt Trigger (TAT) function in the switching system 110 detects a call attempt to a primary directory number (DN) associated with the analog phone 145 line. Rather than terminate the call to the analog phone 145 line, however, the switching system 110 forwards the call to a VoN number associated with the analog phone 145 at the application server 130 at block 205.

Figure 3:
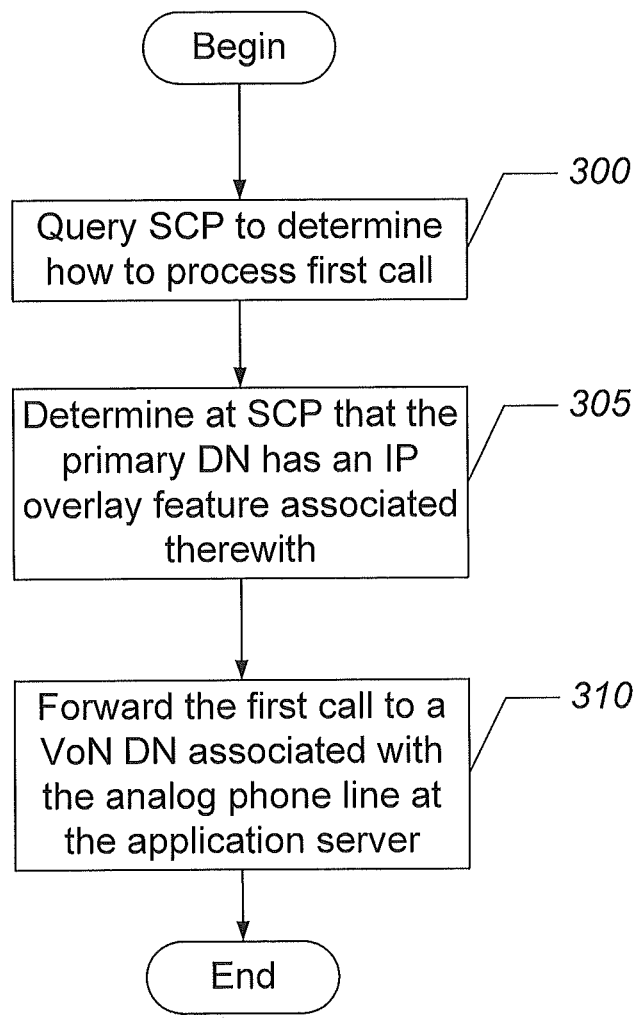

In some embodiments of the present invention illustrated in FIG. 3, the switching system 110 may use the SCP 140 to determine how to process the call to the primary DN associated with the analog phone 145 line. Operations begin at block 300 where the switching system 110 queries the SCP to determine how to process the call to the primary DN associated with the analog phone 145 line. At block 305, the SCP determines that the primary DN has an IP overlay feature associated therewith, which indicates that the call should be forwarded to the VoN DN associated with the analog phone 145 line at the application server 130. As a result, the switching system 110 forwards the call to the primary DN associated with the analog phone 145 line to a VoN DN that is associated with the analog phone 145 line at the application server 130 at block 310 without power ringing the analog phone 145 line.

Returning to FIG. 2, the application server 130 at block 210 generates a second call from the application server 130 to, for example, a RingMaster DN associated with the analog phone 145 line. In more detail, the application server 130 directs the softswitch complex 120 to call the analog phone 145 line using the RingMaster DN. For example, the application server 130 may direct the softswitch complex 120 to make a remote office call using the "Remote Office" feature of the BroadWorks VoIP application software discussed above. Advantageously, the application server 130 may direct the softswitch complex 120 to use the calling number associated with the initial caller to the primary number associated with the analog phone 145 line as the calling number so the called party can tell who the caller is using a CallerID service.

Thus, according to some embodiments of the present invention, an analog phone line may have three phone numbers associated therewith: a primary DN, a RingMaster DN, and a VoN DN that is used to forward calls to the application server. The user of the analog phone line, however, does not need to know that a VoN DN is associated with the analog phone line. This is because the VoN subscription may be set up, for example, with the Remote Office feature of the BroadWorks VoIP application software turned on permanently. Moreover, the user of the analog phone line need not know that the RingMaster DN is associated with the analog phone line.

The TAT function of the switching system 110 detects the call attempt to the RingMaster DN associated with the analog phone 145 line. The switching system 110 communicates with the SCP 140 to determine how to process the call to the RingMaster DN associated with the analog phone 145 line.

Figure 4:
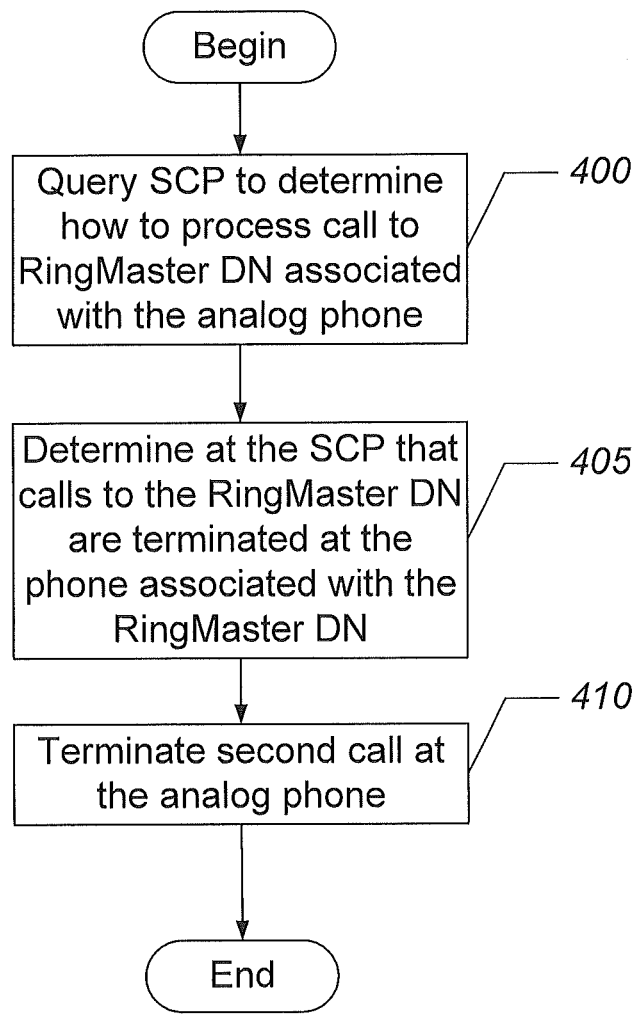
Figure 5:
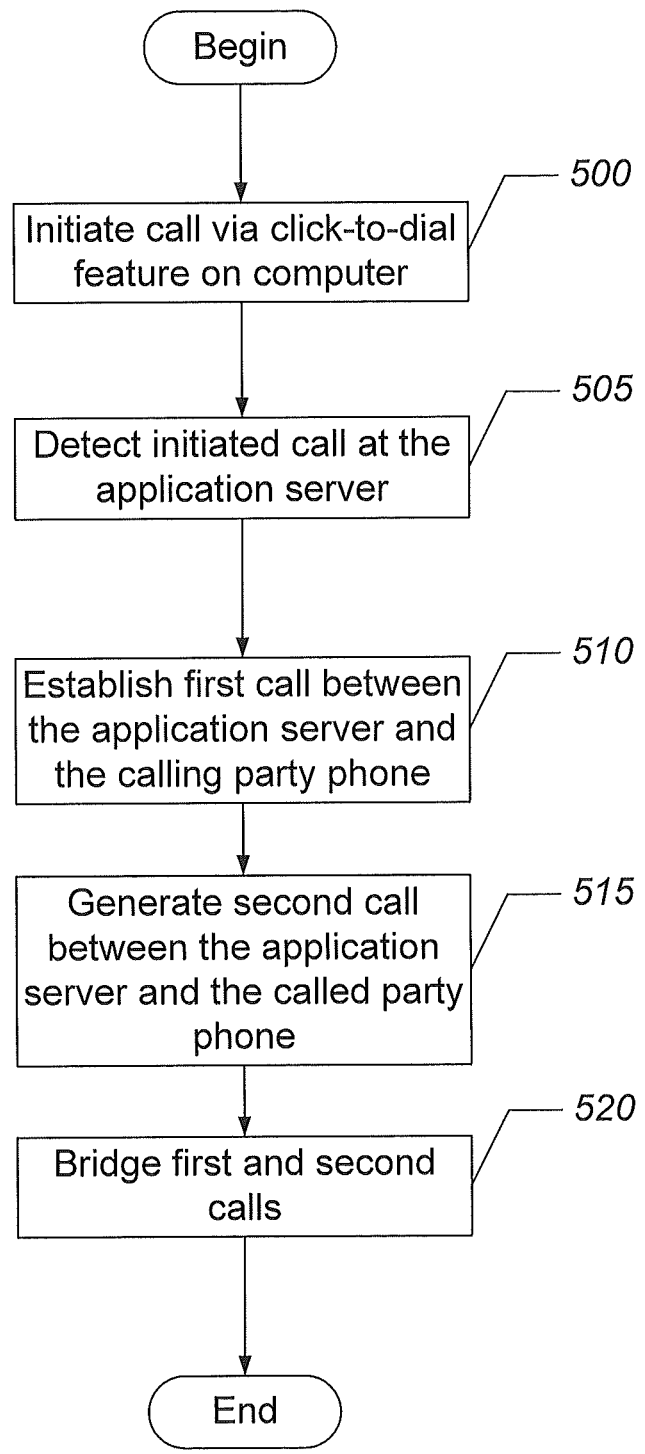

FIG. 4 illustrates operations for determining how to process the call to the RingMaster DN associated with the analog phone 145 line in accordance with some embodiments of the present invention. Operations begin at block 400 where the switching system 110 queries the SCP 140 to determine how to process the second call. At block 405, the SCP 140 determines that calls to the RingMaster DN associated with the analog phone 145 line are terminated at the analog phone 145 line. As a result, the switching system 110 terminates the call to the RingMaster DN associated with the analog phone 145 line by power ringing the analog phone 145 line at block 410. In some embodiments of the present invention, the RingMaster number may provide a different power ringing pattern than the primary DN associated with the analog phone line.

Returning to FIG. 2, operations continue at block 215 where the switching system 110 detects a communication path completion to the analog phone 145 line at block 215. The softswitch complex 120 then bridges the call from the phone 150 line to the primary DN associated with the analog phone 145 line, which was forwarded to the application server 130, with the call made from the application server 130 to the RingMaster DN associated with the analog phone 145 line at block 220. If an off-hook is not detected, e.g., if the analog phone 145 is already off-hook, then the phone 150 line may be provided with a busy signal or busy treatment, such as forwarding to voice mail. The application server 130 may also communicate with the computer 160 to provide IP like features, e.g., a pop-up window to indicate that there is a new call and to provide options on how to handle the call, for the call from the phone 150 line to the analog phone 145 line. These features may include, but are not limited to, calling name and/or number of the entity associated with the phone 150 line, call forwarding, call forwarding to voice mail, recording an instance of the call in a call log, and/or processing incoming calls based on a defined profile, e.g., send all calls to voice mail between certain times, on certain days, etc. Advantageously, through the use of the VoN complex overlay network, an analog phone customer that has a computer may enjoy features that traditionally are provided for customers that have purchased VoIP service and have installed the associated CPE.

Calls may be originated on the analog phone 145 line and processed in a conventional manner. However, in accordance with some embodiments of the present invention, a call may be originated via the computer 160 using, for example, a click-to-dial feature as described hereafter with respect to FIG. 5. Operations begin at block 500 where a call is initiated via a click-to-dial feature on the computer 160. This may be, for example, an address book where a user may select a person, place, or other entity to call via a user interface. In the present example, a user may use the computer 160 to initiate a call to the entity associated with the phone 150. As discussed above with respect to FIG. 1, a network operator may use the user interface server 180 to provide a desktop interface on the computer 160 that highlights features and services that are provided by the network operator rather than the user interface provided by third-party VoIP application software that may be installed on the application server 130. At block 505, the application server 130 detects the call initiated by the computer 160 and establishes a first call with the calling party phone line at block 510. In this example, the application server 130 establishes a call with the analog phone 145 line by instructing the softswitch complex 120 to call the RingMaster DN associated with the analog phone 145 line as described above with respect to block 210 of FIG. 2 and FIG. 4. By calling the RingMaster DN associated with the analog phone 145 line, the TAT function of the switching system 110 in cooperation with the SCP 140 terminates the call to the analog phone 145 line rather than attempting to terminate the call back to the application server 130. Had the application server 130 called the primary DN associated with the analog phone 145 line, then, as discussed above with respect to block 205 of FIG. 2 and FIG. 3, the TAT function of the switching system 110 in cooperation with the SCP 140 would terminate the call back to the application server 130.

At block 515, the application server 130 instructs the softswitch complex 120 to generate a second call between the application server 130 and the line or channel associated with the called party, e.g., the line or channel associated with the phone 150 after the softswitch complex determines that the first call to the RingMaster DN associated with the analog phone 145 line has been answered, i.e., an off-hook is detected. When the softswitch complex 120 determines that a communication path has been completed to the line or channel associated with the phone 150, the softswitch complex 120 bridges the first call between the application server 130 and the phone 145 and the second call between the application server 130 and the phone 150 to create a call between the phone 145 line and the phone 150 line or channel. The first and second calls may be bridged before an off-hook is detected on the phone 150 line or channel to ensure that the calling party receives a busy signal if the phone 150 line or channel is busy.

Thus, according to some embodiments of the present invention, a customer with an analog phone line may have a primary DN and a RingMaster DN assigned to the analog phone line to allow the switching system 110 and the SCP 140 to use the called DN as a criterion for determining whether a call should be terminated to the analog phone line or whether the call should be re-routed and terminated at the application server 130. In other embodiments, however, if the SCP 140 is capable of distinguishing calls, that are originated by the application server 130 from other call origination sources, then a second DN for the analog phone 145 line may be unnecessary.

In some embodiments, if a person were to call the VoN DN and/or the RingMaster DN, which are associated with the analog phone line, directly, then power ringing may not be applied to the analog phone line. Instead, the call may be treated like a call to a non-existent number or the caller could be provided with an audible ringing tone without forwarding to voice mail. Direct calls to the RingMaster DN may be detectable because at least one of the call parameters when a call is established from the VoN DN to the RingMaster DN may be configurable. As a result, the SCP may be able to distinguish when calls to the RingMaster DN are coming from the VoN DN or directly from another phone.

The flowcharts of FIGS. 2-5 illustrate the architecture, functionality, and operations of embodiments of methods, systems, and/or computer program products for operating a communication network so as to provide IP like features to a user that has an analog phone line and a computer via a VoN overlay network that includes an application server. In this regard, each block represents a module, segment, or portion of code, which comprises one or more executable instructions for implementing the specified logical function(s). It should also be noted that in other implementations, the function(s) noted in the blocks may occur out of the order noted in FIGS. 2 and 5. For example, two blocks shown in succession may, in fact, be executed substantially concurrently or the blocks may sometimes be executed in the reverse order, depending on the functionality involved.

Many variations and modifications can be made to the embodiments without substantially departing from the principles of the present invention. All such variations and modifications are intended to be included herein within the scope of the present invention, as set forth in the following claims.

That which is claimed:

1. A method of operating a communication network, comprising:
   detecting a first call to a primary directory number associated with an analog phone line;
   forwarding the first call to an application server by forwarding the first call to a voice over network number associated with the analog phone line;
   generating a second call from the application server to a secondary directory number associated with the analog phone line;
   detecting a communication path completion to the analog phone line; and
   bridging the first call and the second call responsive to the detecting of the communication path completion;

wherein the generating of the second call from the application server to the secondary directory number comprises:
sending a query to a signal control point to determine how to process the second call;
determining at the signal control point that calls to the secondary directory number are terminated at the analog phone line associated with the secondary directory number; and
terminating the second call to the analog phone line associated with the primary and secondary directory numbers responsive to the determining that calls to the second directory number are terminated at the analog phone line associated with the secondary directory number;
wherein the forwarding of the first call to the application server comprises:
routing the first call to the application server without power ringing the analog phone line associated with the primary and secondary directory numbers;
wherein the generating of the second call from the application server to the secondary directory number comprises:
power ringing the analog phone line associated with the primary and secondary directory numbers.

2. The method of claim 1, wherein the forwarding of the first call to the application server comprises:
sending a query to a signal control point to determine how to process the first call;
determining at the signal control point that the primary directory number has an Internet Protocol overlay feature associated therewith; and
forwarding the first call to the application server responsive to the determining that the primary directory number has an Internet Protocol overlay feature associated therewith.

3. The method of claim 1, further comprising:
activating call termination features on a computer associated with the analog phone line via the application server.

4. The method of claim 3, wherein the call termination features comprise processing incoming calls based on a defined profile.

5. The method of claim 1, wherein the generating the second call from the application server to the secondary directory number associated with the analog phone line comprises:
using a directory number associated with a calling party associated with the first call as a calling number associated with the second call from the application server to the secondary directory number.

6. A communication network, comprising:
a switching system;
an application server; and
a softswitch that communicatively couples the application server to the switching system;
wherein the switching system is to detect a first call to a primary directory number associated with an analog phone line and to forward the first call to the application server by forwarding the first call to a voice over network number associated with the analog phone line, the application server is to instruct the softswitch to generate a second call to a secondary directory number associated with the analog phone line, and the softswitch is to bridge the first and second calls responsive to detection of a communication path completion to the analog phone line;
wherein the analog phone line is a first analog phone line, and wherein the application server is further to detect a third call that is initiated by a computer associated with the first analog phone line to a second phone line, to instruct the softswitch to establish a fourth call with the first analog phone line, to instruct the softswitch to generate a fifth call to the second phone line, and the softswitch is to bridge the fourth call between the application server and the first analog phone line and the fifth call between the application server and the second phone line so as to create a sixth call between the first analog phone line and the second phone line;
a signal control point that is communicatively coupled to the switching system and is to determine that calls to the primary directory number are forwarded to the application server if the primary directory number has an Internet Protocol overlay feature associated therewith, and that calls to the secondary directory number are terminated at the first analog phone line associated therewith responsive to queries from the switching system; and
a user interface server that is connected between the computer associated with the first analog phone line and the application server that is to provide a user interface via which a user can initiate the third call to the second phone line.

7. The communication network of claim 6, wherein the application server is further to instruct the softswitch to generate the fifth call to the second phone line responsive to establishing the fourth call between the application server and the first analog phone line; and
wherein the softswitch is further to bridge the fourth call between the application server and the first analog phone line and the fifth call between the application server and the second phone line responsive to detection of a communication path completion to the second phone line.

* * * * *